US006760994B2

(12) United States Patent
Henault et al.

(10) Patent No.: US 6,760,994 B2
(45) Date of Patent: Jul. 13, 2004

(54) FISHING ROD CASE

(75) Inventors: Mark Russell Henault, Arvada, CO (US); Paul W. R. Hields, P.O. Box 502, Avon, CO (US) 81620

(73) Assignee: Paul W. R. Hields, Avon, CO (US)

( * ) Notice: Subject to any disclaimer, the term of this patent is extended or adjusted under 35 U.S.C. 154(b) by 266 days.

(21) Appl. No.: 10/236,715

(22) Filed: Sep. 6, 2002

(65) Prior Publication Data

US 2004/0045212 A1 Mar. 11, 2004

(51) Int. Cl.[7] .............................................. A01K 97/08
(52) U.S. Cl. ..................... 43/26; 43/54.1; 206/315.11
(58) Field of Search ...................... 43/26, 54.1, 57.1; 206/315.11; 224/922; 220/4.21, 4.24, 23.88; D3/260

(56) References Cited

U.S. PATENT DOCUMENTS

| | | | |
|---|---|---|---|
| 3,349,512 A | 10/1967 | Walker | |
| 3,772,819 A * | 11/1973 | Ratzlaff | 43/26 |
| 3,811,216 A | 5/1974 | Sauey et al. | |
| 4,170,801 A * | 10/1979 | Ward | 114/343 |
| 4,171,588 A | 10/1979 | Hoffman et al. | |
| D254,696 S | 4/1980 | Adams | |
| 4,493,416 A * | 1/1985 | Steinman | 206/315.11 |
| 4,967,504 A * | 11/1990 | Craft | 43/26 |
| D316,327 S | 4/1991 | Craft | |
| 5,046,279 A | 9/1991 | Smith et al. | |
| D320,694 S | 10/1991 | Brant | |
| D321,281 S | 11/1991 | Cooper | |
| 5,341,590 A | 8/1994 | Hepworth et al. | |
| 5,404,670 A * | 4/1995 | Noll | 43/54.1 |
| 5,425,194 A | 6/1995 | Miller | |
| D410,333 S | 6/1999 | Coca | |
| 5,937,568 A * | 8/1999 | Morgan | 43/21.2 |
| 6,062,382 A * | 5/2000 | Czerkie | 206/315.11 |
| 6,408,564 B1 * | 6/2002 | Murphy | 43/26 |
| 6,450,333 B1 * | 9/2002 | McClenahan et al. | 206/315.11 |
| 2002/0020644 A1 * | 2/2002 | Belanger | 206/315.11 |

* cited by examiner

Primary Examiner—Peter M. Poon
Assistant Examiner—David J Parsley
(74) Attorney, Agent, or Firm—Dorr, Carson, Sloan, Birney & Kramer, P.C.

(57) ABSTRACT

A fishing rod case has a plurality of segments that can be removably connected together in an end-to-end manner to achieve a desired length. Each segment has a connector that enables end-to-end engagement between adjacent segments, and a tubular passageway in axial alignment with the tubular passageways of other segments to store a number of fishing rods. A plurality of elongated security bars can be removably attached in series to one another and to the segments. A fastener is used to secure the security bars to the segments and prevent disassembly of the segments while the fastener is in place.

25 Claims, 5 Drawing Sheets

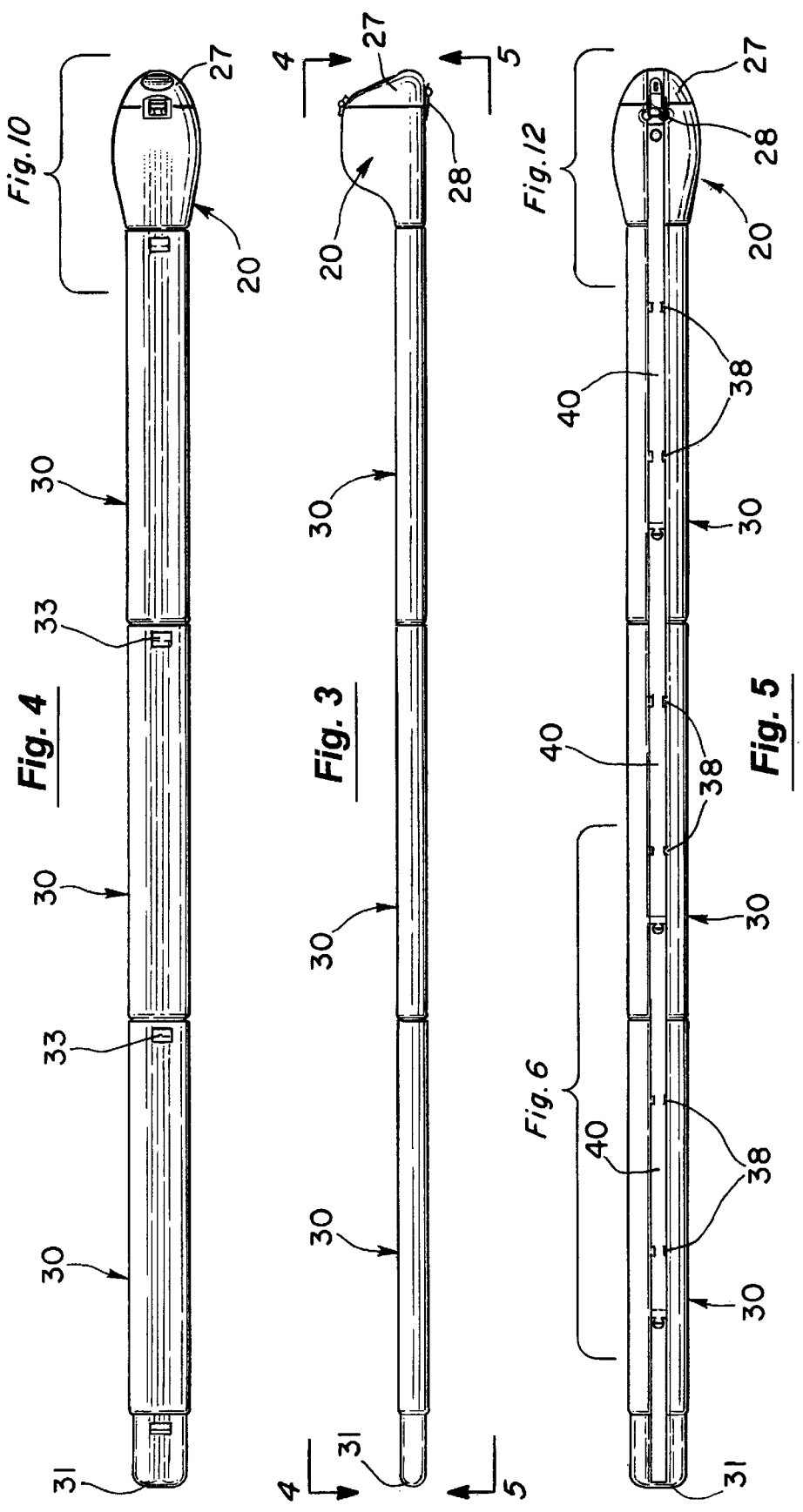

FISHING ROD CASE

BACKGROUND OF THE INVENTION

1. Field of the Invention

The present invention relates generally to the field of fishing rod cases. More specifically, the present invention discloses a fishing rod case made of a series of modular segments that can be connected together in an end-to-end manner to accommodate a fishing rod of any length.

2. Statement of the Problem

Fishing rods are very easily damaged or broken. As a protective measure, fishing rods are commonly stored in fishing rod cases, particularly for transportation. Fishing rod cases are commercially available in a wide variety of configurations. A metal or hard plastic tube is often used to protect the fishing rod. Some fishing rod cases also include an enlarged chamber at one end to hold a reel attached to the fishing rod.

Conventional fishing rod cases are made in a variety of lengths to accommodate fishing rods of various lengths. This creates a problem in that the owner will need to buy several fishing rod cases if he owns fishing rods of different lengths. In response, there have been efforts in the past to create a fishing rod case having an adjustable length to accommodate a range of fish rod sizes. For example, a series of telescoping tubular segments can be employed. Alternatively, a series of tubular segments can be removably fastened together in an end-to-end fashion to achieve a desired length. However, there is a risk of damage or theft to the fishing rods if the case segments can become accidentally disassembled or can be readily disassembled by a thief. Therefore, a need exists for a fishing rod case having both an adjustable length and security.

3. Prior Art

The prior art in the field of fishing rod cases includes the following:

| Inventor | Patent No. | Issue Date |
| --- | --- | --- |
| Walker | 3,349,512 | Oct. 31, 1967 |
| Sauey et al. | 3,811,216 | May 21, 1974 |
| Hoffman et al. | 4,171,588 | Oct. 23, 1979 |
| Adams | Des. 254,696 | Apr. 15, 1980 |
| Craft | Des. 316,327 | Apr. 23, 1991 |
| Smith et al. | 5,046,279 | Sep. 10, 1991 |
| Brant | Des. 320,694 | Oct. 15, 1991 |
| Cooper | Des. 321,281 | Nov. 5, 1991 |
| Hepworth et al. | 5,341,590 | Aug. 30, 1994 |
| Miller | 5,425,194 | Jun. 20, 1995 |
| Coca | Des. 410,333 | Jun. 1, 1999 |

Walker discloses a carrying case for a fishing rod and reel having a detachable rod section. The rod section is secured to the reel section by means of a spring lock that engages a hole or indentation in the reel section.

Sauey et al. disclose a fishing rod case that uses a spring lock mechanism to adjust the length of the telescoping segments of the case.

Adams, Craft, Smith et al., Brant, Miller, Hoffman et al., Hepworth et al., Cooper, and Coca disclose other examples of fishing rod cases.

4. Solution to the Problem

None of the prior art references discussed above show a modular fishing rod case that has a series of modular tubular segments with interlocking security bars. The tubular segments can be connected together to accommodate a wide variety of fishing rod lengths. The security bars help to prevent accidental or unauthorized disassembly of the tubular segments, and therefore help to prevent theft of, or damage to fishing rods stored in the case.

SUMMARY OF THE INVENTION

This invention provides a fishing rod case having a plurality of segments that can be removably connected together in an end-to-end manner to achieve a desired length. Each segment has a connector that enables end-to-end engagement between adjacent segments, and a tubular passageway in axial alignment with the tubular passageways of other segments to store a number of fishing rods. A plurality of elongated security bars can be removably attached in series to one another and to the segments. A fastener is used to secure the security bars to the segments and prevent disassembly of the segments while the fastener is in place.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 3 is a side elevational view of the assembled fishing rod case 10 corresponding to FIG. 1.

FIG. 4 is a top view of the assembled fishing rod case 10 corresponding to FIG. 1.

FIG. 5 is a bottom view of the assembled fishing rod case 10 corresponding to FIG. 1.

DETAILED DESCRIPTION OF THE INVENTION

Figure 1:
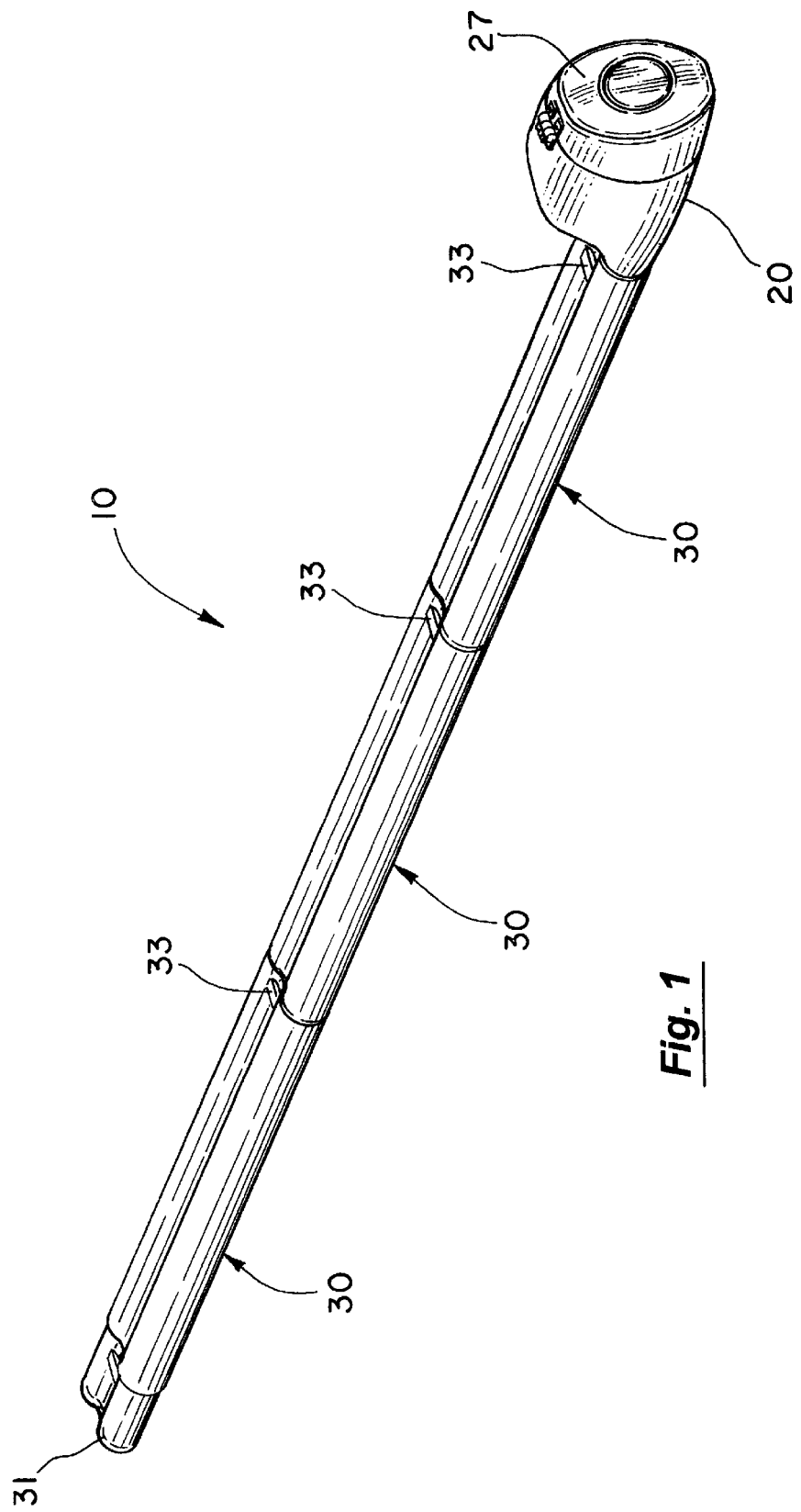
FIG. 1 is a perspective view of an assembled fishing rod case 10.

Turning to FIG. 1, a perspective view is provided of the assembled fishing rod case 10. Corresponding side, top, and bottom views of the assembled fishing rod case 10 are shown in FIGS. 3 through 5, respectively. The major components of the assembly are a series of tubular segments 30 that can be removably connected to one another in an end-to-end manner to hold a fishing rod of a desired length, and a series of elongated security bars 40. These security bars 40 can be removably connected to one another in an end-to-end manner and attached to the assembled segments 30 to help prevent accidental or unauthorized disassembly of the fishing rod case 10.

Figure 2:
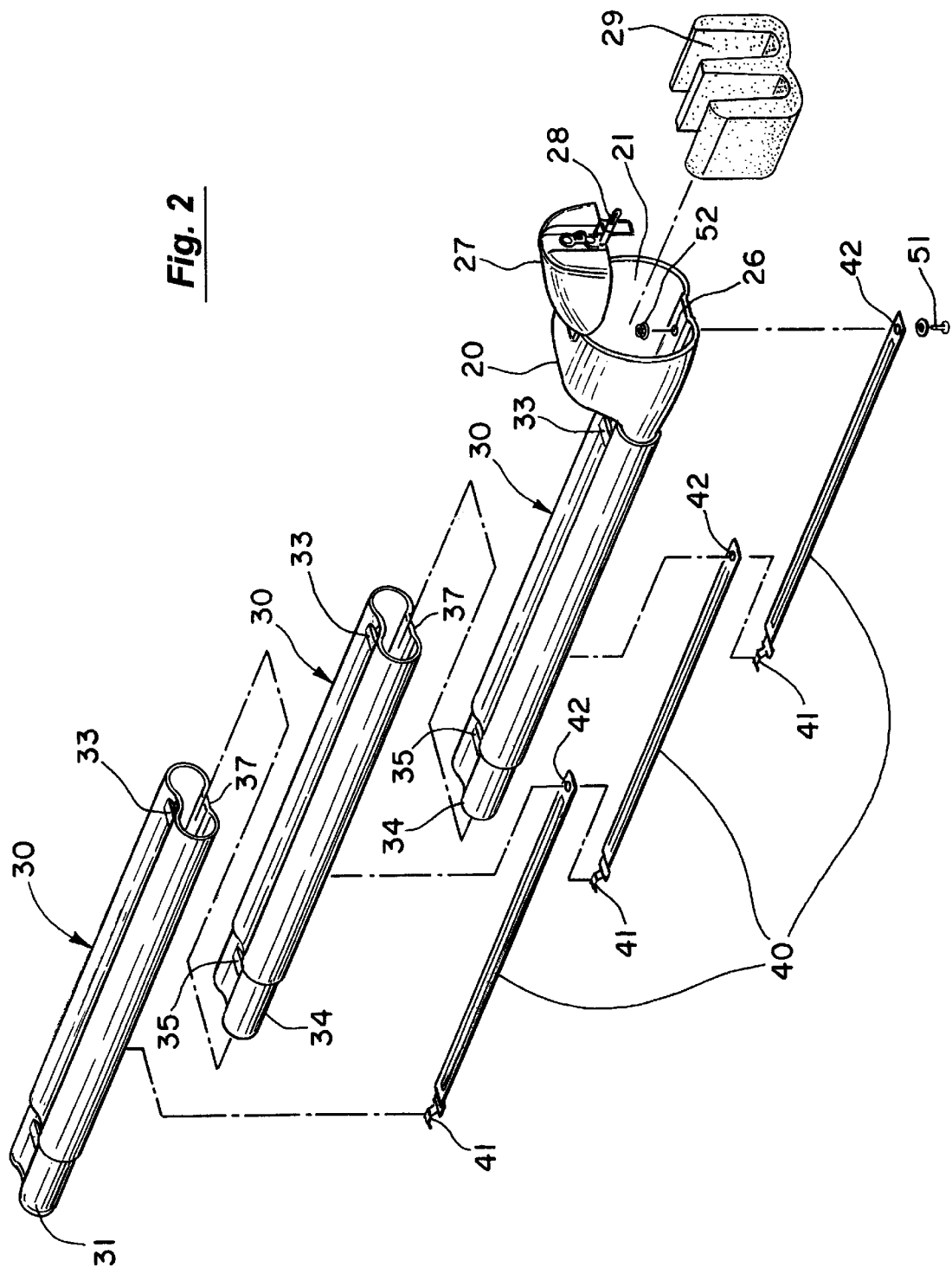
FIG. 2 is an exploded perspective view of the tubular segments 30 and security bars 40 of the fishing rod case 10.

An exploded perspective view is shown in FIG. 2 with further details of the segments 30 and security bars 40. Each segment 30 has a tubular passageway 32 extending axially along its length to hold a portion of at least one fishing rod. For example, the embodiment shown in the accompanying drawings has a passageway 32 with a cross-section designed to accommodate up to two fishing rods. A simple circular cross-section is sufficient for a single fishing rod. Multiple fishing rods can be accommodated by multiple passageways or by a single passageway having an appropriate cross-sectional shape and dimensions.

Each segment 30 also has a connector 34 that enables end-to-end removable engagement between adjacent segments 30 so that the tubular passageways 32 of the segments 30 are in axial alignment with one another to store a fishing rod. In the embodiment shown in FIG. 2, the connector 34 is a sleeve that extends axially from one end of the segment 30 and can be inserted into the end of an adjacent segment 30. Thus, any number of connectors can be attached together in series. When assembled, a protrusion 35 on the connector 34 engages a complementary detent 33 in the housing of the segment 30 to produce a snap fit and help ensure that the connector 34 is fully engaged. Alternatively an enlarged collar, interlocking flanges, or other types of connectors could be readily substituted. The distal end 31 of the one of the segments 30 can be closed to protect the tip of the fishing rod.

Figure 10:
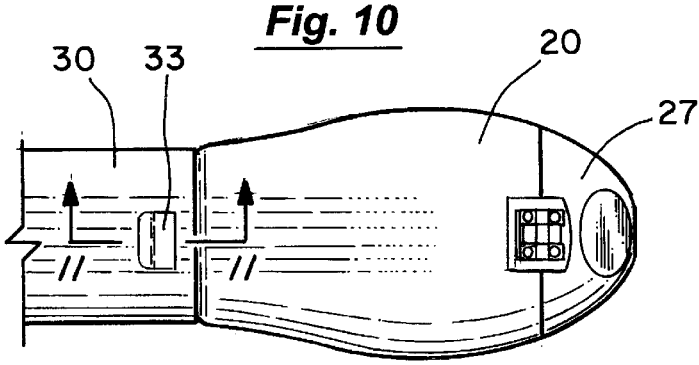
FIG. 10 is a detail top view of the reel segment 20.
Figure 11:
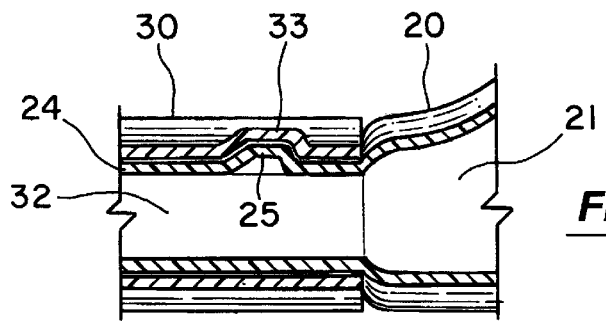
FIG. 11 is a detail cross-sectional view of the reel segment 20 corresponding to FIG. 10.
Figure 12:
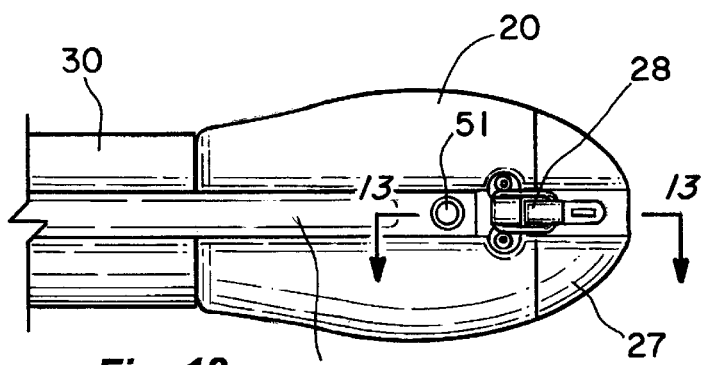
FIG. 12 is a detail bottom view of the reel segment 20.
Figure 13:
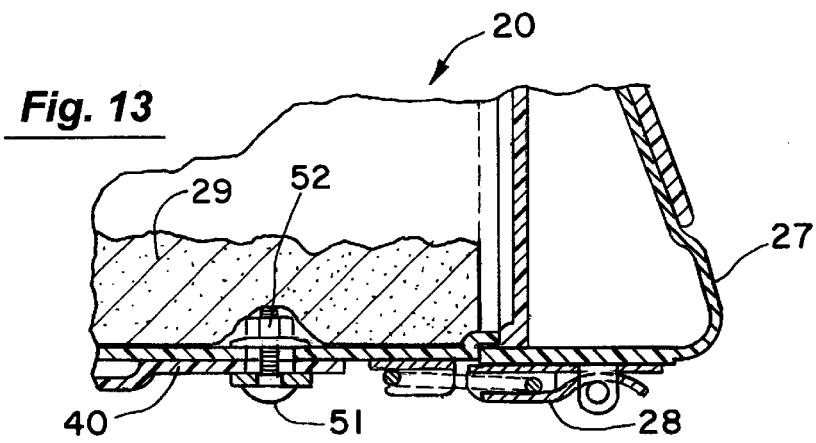
FIG. 13 is a detail cross-sectional view of a portion of the bottom of the reel segment 20 showing the latch 28 and the fastener 51, 52 used to secure the end of a security bar 40 to the reel segment 20.

One of the segments 20 can be designed with an enlarge interior chamber 21 to hold the reel attached to a fishing rod, as illustrated in FIGS. 3 and 10–13. This reel segment 20 includes a door 27 with lockable latch 28. When the door is open, a fishing rod can be inserted through the reel segment 20 and into the other segments 30 with the reel remaining in the reel segment 20. A foam insert 29 can be placed in the reel chamber 21 to cushion the reel(s). The reel segment 20 is also equipped with a connector 24 having a protrusion 25, like the other tubular segments 30, so that it can be removably attached to the next tubular segment 30 in the manner previously described. FIG. 10 is a detail top view of the reel segment 20 connected to an adjacent tubular segment 30. FIG. 11 is a corresponding detail cross-sectional view of this connection between the reel segment 20 and the adjacent tubular segment 30.

Each security bar 40 is an elongated strip having opposing ends with a protrusion 41 at one end and a hole 42 through the other end. For example, the security bar can be a plastic or metal strip. The protrusion 41 can be inserted through the hole of an adjacent security bar 40. In this manner, it is possible to connect any desired number of security bars 40 in series.

In addition, a hole 36 extends into the bottom of each tubular segment 30. When a series of tubular segments 30 are connected together, these holes 36 fall at spaced intervals in the assembly that match the length of each security bar 40. Each hole 36 is large enough to receive and engage the protrusion 41 of a security bar 40.

Figure 6:
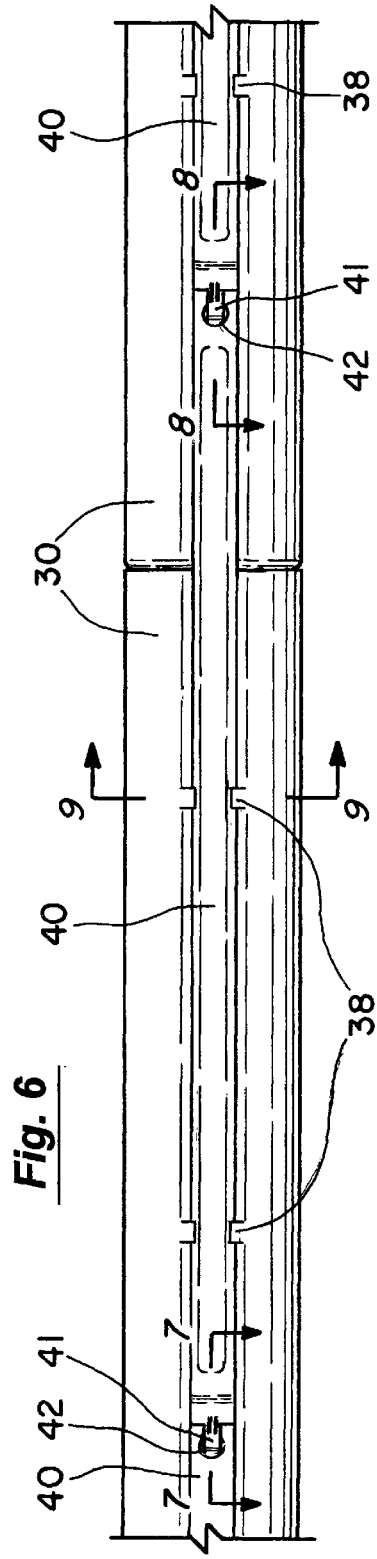
FIG. 6 is a detail bottom view of two segments 30 of the fishing rod case joined together, also showing a security bar 40.
Figure 8:
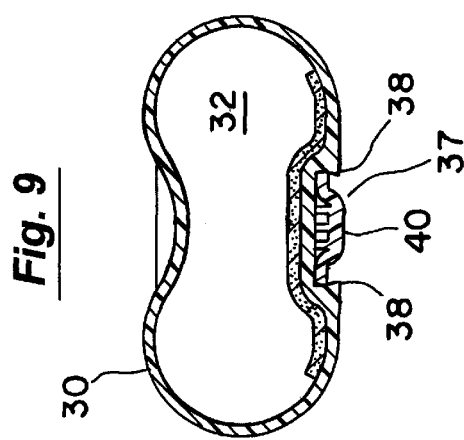
FIG. 8 is a detail cross-sectional view of a portion of the fishing rod case showing the attachment between two security bars 40 and a segment 30.
Figure 7:
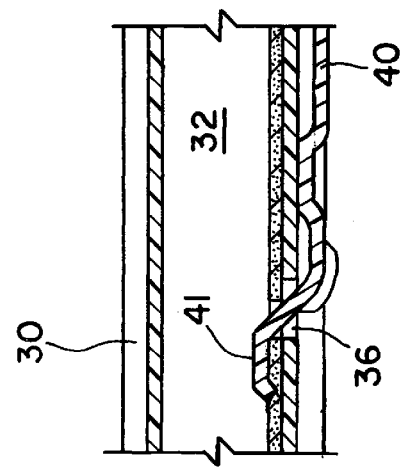
FIG. 7 is a detail cross-sectional view of a portion of the end segment 30 of the fishing rod case showing the attachment of a security bar 40.

Overall assembly of the security bars 40 is illustrated most clearly in FIG. 2. First, the protrusion 41 at the tip of a first security bar 40 is inserted into the hole 36 in the end segment 30, as shown in FIG. 7. A second security bar 40 is then connected to the other end of the first security bar by inserting the protrusion 41 of the second security bar through the hole 42 in the end of the first security bar. However, in contrast, the protrusion of the second security bar is also inserted into the hole 36 in the housing of the second segment 30, as shown in FIG. 8. Thus, the first security bar is attached to both the end segment and the second segment. If necessary, this process can be repeated for a third security bar and any subsequent security bars depending on the length of the assembly. FIG. 6 is a detail bottom showing a security bar 40 spanning two segments 30 of the fishing rod case. For example, the second security bar spans portions of the second and third segments, and the third security bar spans portions of the third segment and the reel segment 20 in the embodiment depicted in FIG. 2.

The embodiment of the present invention shown in the accompanying figures employs interlocking sets of holes and protrusions. It should be expressly understood that other types of connectors could be readily substituted to removably attach the security bars 40 in series to one another and to the segments 30.

The hole 42 in the last security bar aligns with the hole in the housing of the last segment (i.e., the hole 26 in the reel segment 20 in FIG. 2). A fastener is inserted through both holes 26 and 42 to secure the end of the security bar 40 to the reel segment 20, which thereby effectively secures all of the security bars to the segments and prevents disassembly of the segments while the fastener is in place. In the embodiment of the present invention shown in FIGS. 2, 12 and 13, the fastener is a nut 52 and bolt 51 with a rounded head. As illustrated in these figures, only the rounded head of the bolt 51 remains outside the assembled fishing rod case. The nut 52 is only accessible from within the reel chamber 21, which can be locked shut by means of the latch 28. Other types of fasteners could be readily substituted for the nut 52 and bolt 51.

Figure 9:
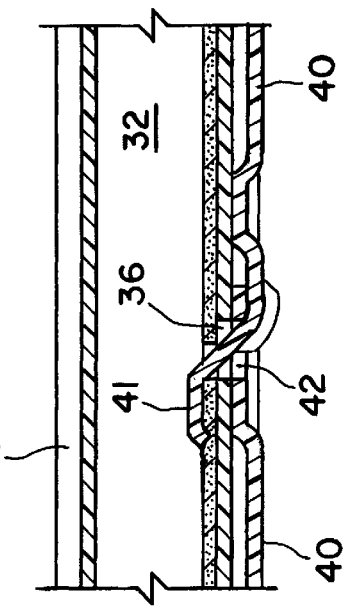
FIG. 9 is a detail cross-sectional view of a portion of the fishing rod case showing attachment of a security bar 40 by tabs 38 to the recessed track 37 in the bottom of the fishing rod case.

Optionally, a recessed track 37 extends along the bottom of the segments 30 to hold the security bars 40, as shown in FIGS. 6 and 9. A series of tabs or clips 38 spaced along the track 27 can be used to removably engage the security bar 40 in the track 37.

The above disclosure sets forth a number of embodiments of the present invention. Other arrangements or embodiments, not precisely set forth, could be practiced under the teachings of the present invention and as set forth in the following claims.

We claim:

1. A fishing rod case comprising:
    a plurality of segments, each segment having a connector enabling end-to-end removable engagement between adjacent segments and a tubular passageway in axial alignment with the tubular passageways of the other segments to store a fishing rod;
    a plurality of elongated security bars removably attachable in series to one another and to the segments; and
    a fastener removably securing the security bars to the segments and preventing disassembly of the segments while the fastener is in place.

2. The fishing rod case of claim 1 wherein each security bar extends along portions of two adjacent segments.

3. The fishing rod case of claim 1 wherein at least one of said segments further comprises a reel chamber for holding a fishing reel with an opening to receive a fishing rod and reel.

4. The fishing rod case of claim 3 further comprising a door for closing the opening to the reel chamber, and a lockable latch for locking the door.

5. The fishing rod case of claim 4 wherein the fastener can be removed only by access from within the reel chamber.

6. The fishing rod case of claim 1 wherein one of the segments comprise a tubular passageway having a closed end.

7. The fishing rod case of claim 1 wherein the security bar comprises a strip having opposing ends with:

a protrusion at one end of the security bar; and a hole at the opposing end of the security bar to receive the protrusion from an adjacent security bar.

8. The fishing rod case of claim 7 wherein at least one segment further comprises a hole, and wherein the protrusion of at least one security bar passes through the hole in an adjacent security bar and removably engages the hole in the segment.

9. The fishing rod case of claim 8 wherein the fastener extends through the hole in a security bar and the hole in a segment to removably secure the security bars to the segments.

10. The fishing rod case of claim 9 wherein the fastener comprises a threaded shaft with an enlarged rounded head and a nut threadably engaging the threaded shaft, and wherein the nut is placed inside the passageway of the segment.

11. The fishing rod case of claim 1 wherein at least one segment further comprises a recessed track with tabs to removably engage the security bars.

12. A fishing rod case for holding a fishing rod and reel comprising:

a reel segment having a reel chamber with an opening to receive a fishing rod and reel; and at least one rod segment having a connector enabling end-to-end removable engagement between adjacent segments, and a tubular passageway in axial alignment with the tubular passageways of the adjacent segments to store a fishing rod;

a plurality of elongated security bars removably attachable in series to one another and to the segments; and a fastener removably securing the security bars to the segments and preventing disassembly of the segments while the fastener is in place.

13. The fishing rod case of claim 12 wherein one of said rod segments has a tubular passageway with a closed end.

14. The fishing rod case of claim 12 wherein each security bar extends along portions of two adjacent segments.

15. The fishing rod case of claim 12 further comprising a door for closing the opening to the reel chamber, and a lockable latch for locking the door.

16. The fishing rod case of claim 12 wherein the fastener can be removed only by access from within the reel chamber.

17. The fishing rod case of claim 12 wherein the security bar comprises a strip having opposing ends with:

a protrusion at one end of the security bar; and a hole at the opposing end of the security bar to receive the protrusion from an adjacent security bar.

18. The fishing rod case of claim 17 wherein at least one segment further comprises a hole, and wherein the protrusion of at least one security bar passes through the hole in an adjacent security bar and removably engages the hole in the segment.

19. The fishing rod case of claim 18 wherein the fastener extends through the hole in a security bar and the hole in a segment to removably secure the security bars to the segments.

20. The fishing rod case of claim 12 wherein at least one segment further comprises a recessed track with tabs to removably engage the security bars.

21. A fishing rod case comprising:

a plurality of segments, each segment having:
(a) a connector enabling end-to-end removable engagement between adjacent segments to achieve a desired length;
(b) a tubular passageway in axial alignment with the tubular passageways of the other segments to store a fishing rod; and
(c) a hole in the segment;

a plurality of elongated security bars, each security bar having opposing ends with a protrusion at one end of the security bar and a hole through the other end of the security bar, wherein the protrusion of each security bar can be inserted through the hole of an adjacent security bar and into the hole in a segment to removably attach the security bar in series to one another and to the segments;

a fastener removably extending through the hole of a security bar and the hole in a segment to thereby secure the security bars to the segments and prevent disassembly of the segments while the fastener is in place.

22. The fishing rod case of claim 21 wherein at least one of said segments further comprises a reel chamber for holding a fishing reel with an opening to receive a fishing rod and reel.

23. The fishing rod case of claim 22 further comprising a door for closing the opening to the reel chamber, and a lockable latch for locking the door.

24. The fishing rod case of claim 23 wherein the fastener can be removed only by access from within the reel chamber.

25. The fishing rod case of claim 21 wherein at least one segment further comprises a recessed track with tabs to removably engage the security bars.

* * * * *